Figure 1:
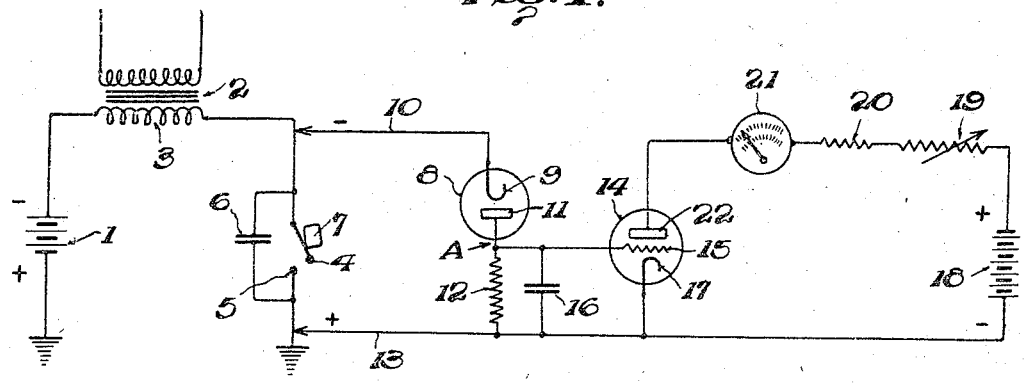

Aug. 26, 1941.　　　　G. V. ELTGROTH　　　　2,254,175
CAM ANGLE TESTER
Filed Dec. 2, 1938

Inventor
George V. Eltgroth
By Doody & Stansfield
Attorneys

Patented Aug. 26, 1941

2,254,175

UNITED STATES PATENT OFFICE 2,254,175

CAM ANGLE TESTER

George V. Eltgroth, Chicago, Ill., assignor to Bendix Radio Corporation, Baltimore, Md., a corporation of Delaware Application December 2, 1938, Serial No. 243,490

4 Claims. (Cl. 175—183)

This invention relates to testing apparatus, and more particularly to apparatus for determining the percentages of open or closed contact condition of a periodic switch with respect to time.

The device to be disclosed may be employed in the testing and adjustment of vibrator interrupters, buzzers, and power driven switches of the periodic type generally. One particular field of application is in determining the cam angle of the timing cam used in automobile ignition systems to drive the interrupter lever. The duration of successive periods of contact closure in such a system is a function of cam angle. The indicator of the test apparatus may be calibrated to read in terms of percentage of closure with respect to time, and a conversion factor employed to convert the reading to terms of cam angle, or an indicator scale may be calibrated to read directly in terms of cam angle if desired.

In the past, when testing ignition systems in this manner, it has been necessary to remove the timer mechanism and test it independently of the associated engine. The average ignition system does not supply power sufficient for simultaneously igniting the engine and meeting the power consumption of prior types of testing equipment. The power consumption of the device to be disclosed is negligible, allowing the timer to be tested while in operation on the engine. In prior art devices the timer is removed from the engine and placed in a special stand. A motor driven spindle is attached to the driving cam of the timer assembly to operate the interrupter, a local source of current is connected with the interrupter, and the output is measured on a meter giving average values of current. The device herein disclosed eliminates the labor of removing and replacing the timer assembly, and eliminates the need for additional bulky and expensive driving mechanism. A test apparatus is shown in which the accuracy of indication is substantially constant over a wide range of engine, and hence, timer speeds. Likewise, the accuracy of indication is substantially independent of the variations of inductance and capacity to be found between different types of ignition coils and condensers as encountered in present day ignition systems, permitting the characteristics for all cars to be indicated on the same scales without need for correction factors.

This invention has for one of its principal objects, therefore, the provision of apparatus for testing periodic switches which is less subject to error in indications of switch operation.

Another object is to provide apparatus for testing periodic switches which is more economical in use and convenient in size.

A further object is to provide apparatus for testing periodic switches in ignition systems under actual operating conditions without affecting the operation of an associated internal combustion engine.

Figure 2:
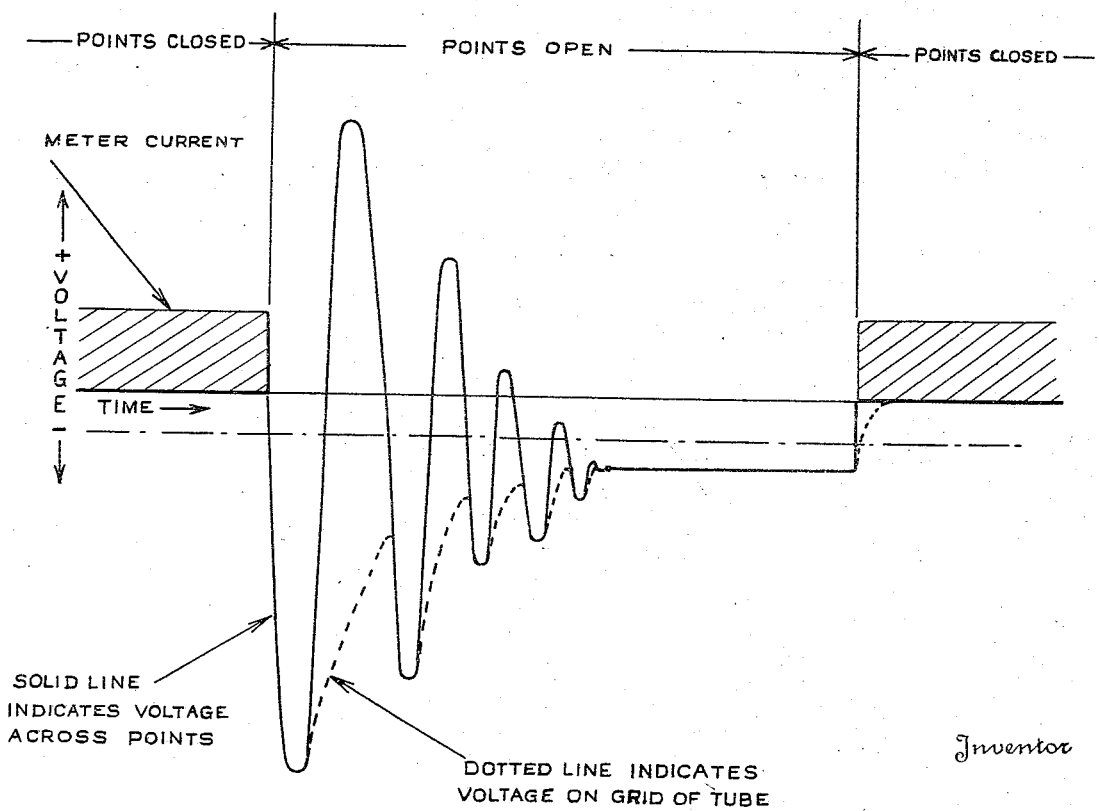

Other objects and advantages will in part be specifically set forth and in part will be obvious when the following specification is read in connection with the drawing, in which, Fig. 1 is a schematic diagram showing the primary circuit of an internal combustion engine ignition system in conjunction with the test apparatus comprising this invention; and Fig. 2 is a graphic representation of the operating characteristics of the test apparatus.

It is to be understood that the drawing illustrates but one of the many uses for which this invention is adapted, and no limitation of the scope of the invention is to be predicated on the specific use or environment in which the apparatus is here shown.

Referring in more detail to Fig. 1, there is shown in diagrammatic form the primary circuit of an ignition system for an internal combustion engine. Included in the primary circuit is a battery 1 having the positive terminal thereof connected to ground as is the practice in many present day automobiles. An ignition coil 2 has one end of its primary winding 3 connected to the negative terminal of the battery 1, and the other end connected to the movable contact 4, carried by the breaker arm as shown diagrammatically. Cooperating with the contact 4 is a fixed contact 5, connected to ground. As customary in ignition systems, a condenser 6 shunts the contacts 4 and 5 to minimize arcing and burning of the contact points under service. The breaker lever is actuated by a timing cam 7 to periodically make and break the primary circuit between contacts 4 and 5.

The test apparatus comprises a rectifier 8, having a cathode 9 which is connected by a lead 10 to the negative side of the breaker switch. The anode 11 of the rectifier 8 is connected to the positive side of the breaker switch through a high resistance 12 and a lead 13. The leads 10 and 13 may terminate in test prods or suitable quick detachable connectors affording a convenient connection to the primary circuit. The input to the rectifier 8 must be constant in polarity and in case an ignition system is tested in which the negative battery terminal is connected to ground, the leads 10 and 13 should be reversed in their connections with the primary circuit as shown in Fig. 1.

An ionizable gas filled tube 14, which may be of the type commercially known as 884, has its control element 15 connected intermediate the rectifier anode 11 and the resistance 12 to a point A. In shunt with the resistance 12 is a condenser 16. The tube 14 has a cathode 17 connected with the lead 13 and the negative terminal of a plate source 18, indicated as a battery. The positive terminal of the plate source 18 is in the series circuit comprising a variable calibrating resistance 19, a limiting resistance 20, a current meter 21, and the plate 22 of the tube 14.

The meter 21 may have a plurality of scales calibrated in terms of cam angle for 3, 4, 6 and 8 lobe cams by which may be directly read the average number of degrees of cam rotation during which the contacts 4 and 5 are closed.

The operation of the apparatus is as follows. When the breaker points 4 and 5 are closed, there is substantially no difference of potential across the switch, and between the leads 10 and 13. No current flows through the rectifier 8, and hence in the tube 14, the control element 15 is substantially at zero potential with respect to the cathode 17, permitting the tube to ionize and pass full plate current. When the breaker points 4 and 5 open, a series of alternating current transients of decreasing amplitude appear across the switch as shown in the solid line, Fig. 2. The transients decay and leave as the potential across the switch only that supplied by the battery 1. The transients are rectified and a current flows through resistance 12, anode 11, and cathode 9 of the rectifier to produce initially a high negative potential at point A by reason of the voltage drop across the resistance 12. The initial negative potential appears on the control element 15 of the tube 14 and causes the tube to extinguish or deionize, and the plate current thereof immediately falls to zero. The condenser 16 tends to produce a smoothing effect on the potential variations occurring at point A, with the result that the potential applied to the control element 15 is substantially as shown in dotted lines in Fig. 2. The value of the condenser 16 is such that the circuit comprising it and resistance 12 has a time constant equal to the time elapsing between the opening of the breaker points and the deionization of tube 14. Thus the plate current of tube 14 flows in successive periods equal in duration to the periods of closed breaker points.

A gas filled tube having a high plate potential with respect to applied grid potentials may be ignited under grid control, but will not thereafter extinguish until the plate potential has been reduced to zero. Both functions are here under the control of the grid by reason of the facts that voltage is applied to the grid through a high impedance source, there is a low plate voltage of approximately 22½ volts and the plate current is held below the limit which is necessary for stable operation with this type of grid circuit. While the tube is conducting there is a space charge of positive ions surrounding the grid which neutralizes the effect of moderate grid voltage variations on the plate current. When the grid is given a sufficiently high negative potential, the accumulation of positive ions by the grid exceeds the rate of ion formation due to applied plate potential. The number of ions in the tube will rapidly decrease and the tube will be extinguished.

In placing the apparatus in operation, the leads 10 and 13 are disconnected, and the variable resistance 19 is adjusted until a full scale deflection of the indicator 21 is obtained. This indicator may be a direct current milliammeter of 0—1 range having a plurality of calibrated scales on the dial. The wave shape of the output circuit of the tube 14 is a succession of flat topped, steep sided waves, each having a duration equal to the periods of breaker point closure, hence the average value of the output current bears a highly accurate relation to the percentage of time in which a closed contact condition exists.

It will be obvious that many changes and modifications may be made by anyone skilled in the art, without departing from the true spirit and scope of the invention as defined in the following claims.

What I claim is:

1. In apparatus for testing periodic switches, a direct current power source connected with said switch, means for producing alternating current transients across said switch upon the opening thereof, means for developing a negative control potential proportional to the peak values of said transients, a space discharge relay having a control element, means for impressing said negative potential on said control element, and means for indicating current flow through said space discharge relay.

2. In test apparatus, a source of control potentials representative of conditions in apparatus under test, relay means responsive to said control potentials, a resistance-capacity network connecting said source and said relay means and having a time constant substantially equal to the response lag of said relay means, a circuit controlled by said relay means, a source of power for said circuit, and indicating means responsive to energy flowing in said circuit.

3. In test apparatus, a source of control potentials representative of conditions in apparatus under test, a space discharge tube responsive to said control potentials, a resistance-capacity network connecting said source with said space discharge tube and having a time constant substantially equal to the response lag of said tube, and means for indicating the flow of current through said tube.

4. In test apparatus, a source of control potentials representative of conditions in apparatus under test, an ionizable gas filled tube having a control element, a resistance-capacity network connecting said source with said control element and having a time constant substantially equal to the deionization time of said tube, and means for indicating the flow of current through said tube.

GEORGE V. ELTGROTH.